United States Patent
Noto

(10) Patent No.: US 8,279,293 B2
(45) Date of Patent: Oct. 2, 2012

(54) IMAGE STABILIZING APPARATUS AND IMAGE PICKUP APPARATUS

(75) Inventor: Goro Noto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 12/862,926

(22) Filed: Aug. 25, 2010

(65) Prior Publication Data

US 2011/0050921 A1 Mar. 3, 2011

(30) Foreign Application Priority Data

Aug. 31, 2009 (JP) .................. 2009-199250

(51) Int. Cl.
*H04N 5/228* (2006.01)

(52) U.S. Cl. ..................................... 348/208.7; 348/374

(58) Field of Classification Search .... 348/208.4–208.7, 348/373, 374; 396/55
See application file for complete search history.

(56) References Cited

U.S. PATENT DOCUMENTS 7,639,933 B2  12/2009  Seo et al.
2006/0077260 A1* 4/2006 Pyo et al. ............... 348/208.7
2006/0115256 A1* 6/2006 Nomura ...................... 396/55
2008/0002957 A1* 1/2008 Ziemkowski et al. ......... 396/55
2008/0085108 A1* 4/2008 Sekino et al. ................. 396/55

FOREIGN PATENT DOCUMENTS

JP  2006-094199  4/2006
JP  2007-025616  2/2007

* cited by examiner

*Primary Examiner* — Gevell Selby

(74) *Attorney, Agent, or Firm* — Cowan, Liebowitz & Latman, P.C.

(57) ABSTRACT

The image stabilizing apparatus includes a base member, a first member shiftable with respect to the base member in a direction orthogonal to an optical axis direction, a first actuator shifting the first member with respect to the base member, an image-pickup element constituted by a photoelectrical conversion element, a second member holding the image-pickup element. The second member is shiftable together with the first member in the direction orthogonal to the optical axis direction and rotatable with respect to the first member in a plane orthogonal to the optical axis direction. The apparatus further includes a second actuator rotating the second member with respect to the first member.

3 Claims, 5 Drawing Sheets

IMAGE STABILIZING APPARATUS AND IMAGE PICKUP APPARATUS

BACKGROUND OF THE INVENTION

1. Field of the Invention

The present invention relates to an image stabilizing apparatus reducing image blur caused by hand shake or the like, and particularly to a sensor moving image stabilizing apparatus shifting and rotating an image sensor (image-pickup element) to reduce the image blur.

2. Description of the Related Art

Image stabilizing apparatuses (or image blur correction apparatuses) detect shaking of image pickup apparatuses caused by user's hand shake or the like by using an angular velocity sensor or an acceleration sensor, and shift an image-pickup element in a direction orthogonal to an optical axis direction or rotate the image-pickup element in a plane orthogonal to the optical axis to reduce image blur. Voice coil motors each being constituted by a coil and a magnet are often used as actuators to shift and rotate (roll) the image-pickup element.

Japanese Patent Laid-Open Nos. 2007-025616 and 2006-094199 have disclosed image stabilizing apparatuses each of which shifts and rolls an image-pickup element by using plural actuators, and detects movement amounts of coils constituting the plural actuators by using hall elements to control a shift position and a roll position of the image pickup element.

However, in the image stabilizing apparatuses disclosed in Japanese Patent Laid-Open Nos. 2007-025616 and 2006-094199, the shift of the image-pickup element influences the detection of the roll position (roll amount) of the image-pickup element, which makes it difficult to accurately control the roll position of the image-pickup element.

SUMMARY OF THE INVENTION

The present invention provides an image stabilizing apparatus capable of reducing an influence of one of a shift operation and a rotation (roll) operation of an image-pickup element on control of the other thereof to accurately control a shift position and a rotation (roll) position of the image-pickup element, and provides an image-pickup apparatus with the same.

The present invention provides as an aspect thereof an image stabilizing apparatus including a base member, a first member configured to be shiftable with respect to the base member in a direction orthogonal to an optical axis direction, a first actuator configured to shift the first member with respect to the base member, an image-pickup element constituted by a photoelectrical conversion element, a second member configured to hold the image-pickup element, and configured to be shiftable together with the first member in the direction orthogonal to the optical axis direction and rotatable with respect to the first member in a plane orthogonal to the optical axis direction, and a second actuator configured to rotate the second member with respect to the first member.

The present invention provides as another aspect thereof an image pickup apparatus includes the above-described image stabilizing apparatus and an image generating part configured to generate image data using an output from the image-pickup element.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
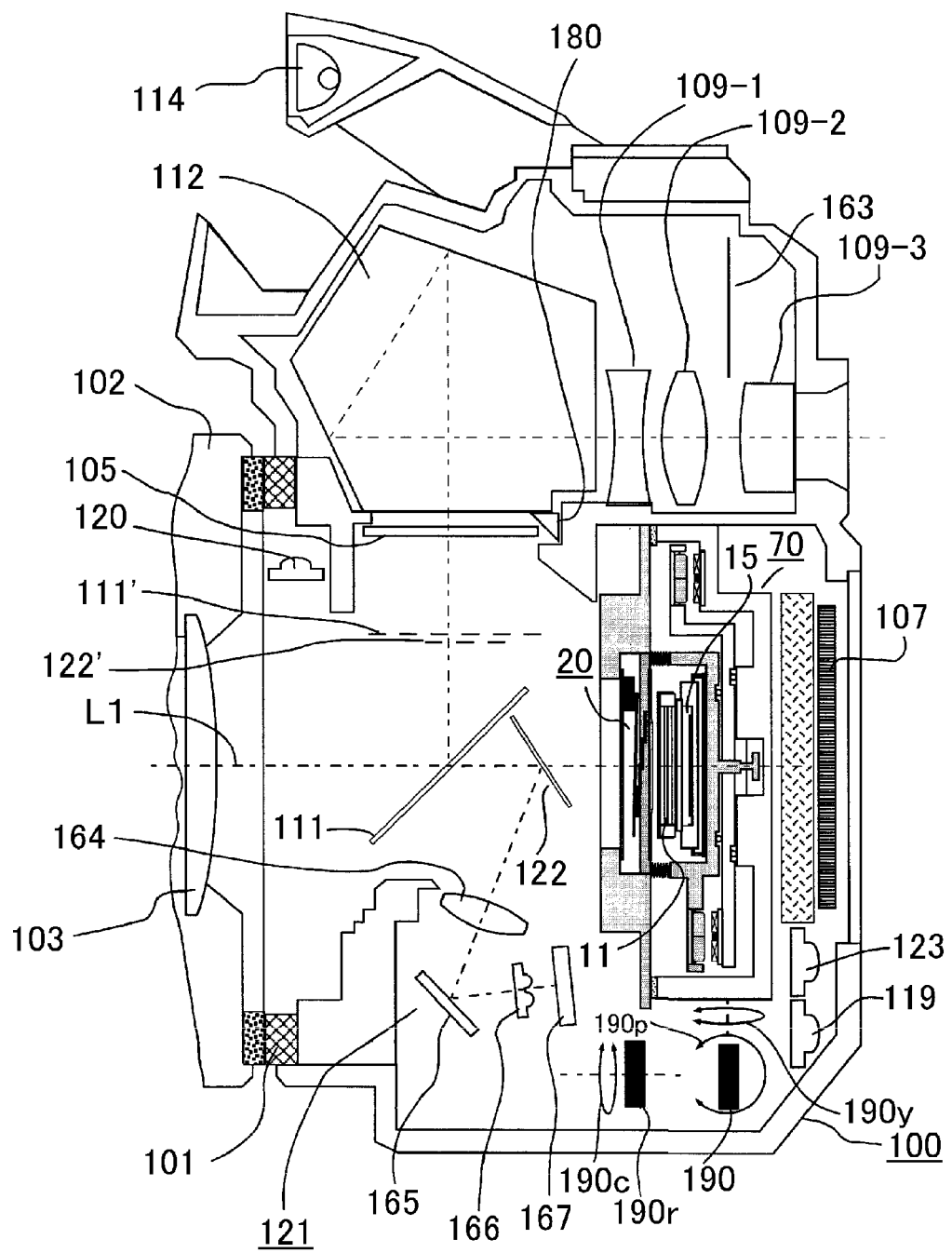
FIG. 1 is a side view showing a configuration of a camera that is an embodiment of the present invention.

FIG. 1 shows a configuration of a single-lens reflex digital camera (image-pickup apparatus) equipped with an image stabilizing unit (image stabilizing apparatus) that is an embodiment of the present invention. FIGS. 2, 3, 4, 5 and 6 show a detail configuration of the image stabilizing unit.

Reference numeral 100 denotes the single-lens reflex digital camera (hereinafter simply referred to as the "camera"), and reference numeral 102 denotes a lens apparatus (interchangeable lens) detachably attached to a mount portion 101 of the camera 100. The camera 100 and the lens apparatus 102 constitute a lens-interchangeable single-lens reflex digital camera system.

Figure 7:
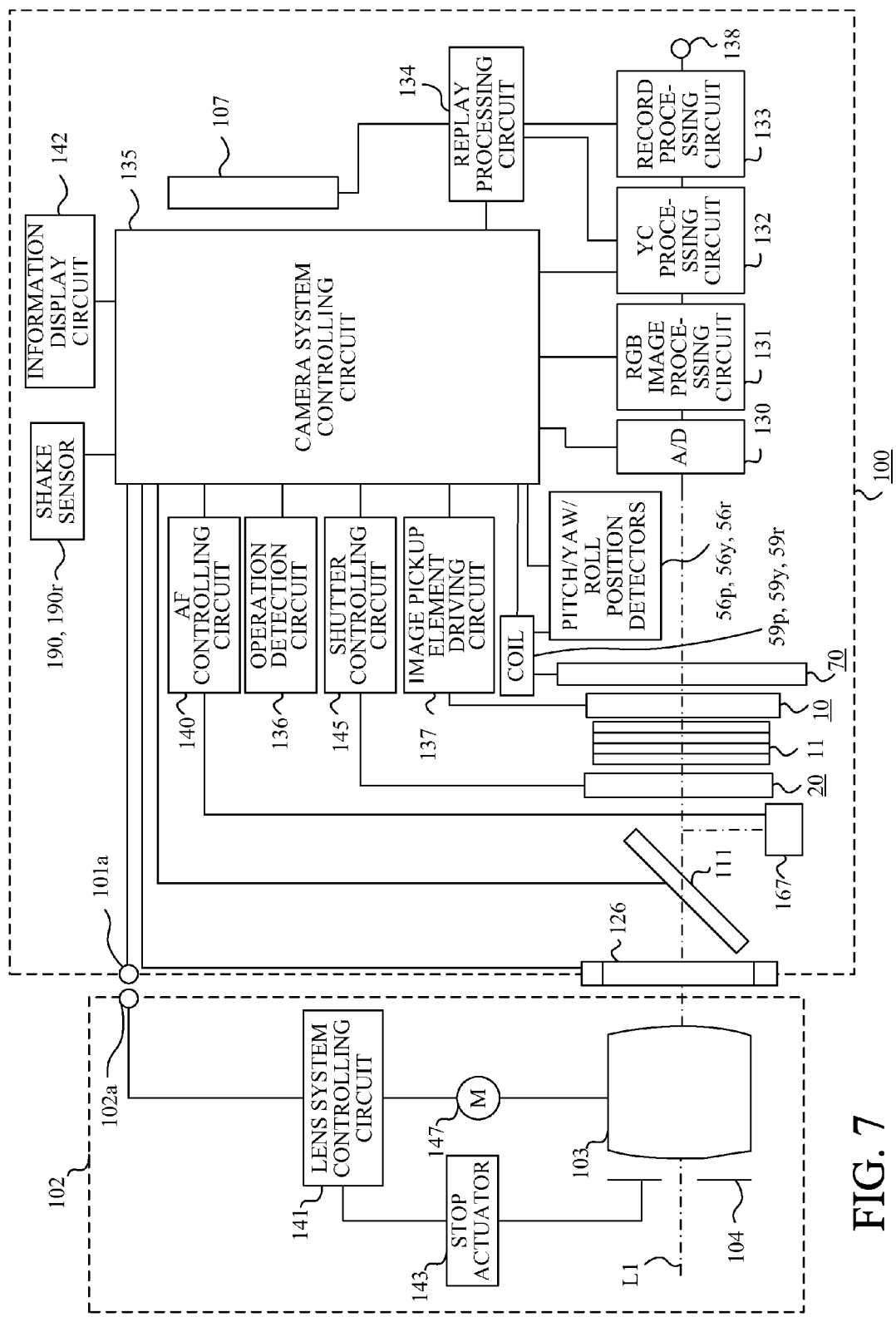
FIG. 7 is a block diagram showing an electrical configuration of the camera.

The lens apparatus 102 is provided with an image-pickup optical system 103 including a zoom lens unit (not shown), a focus lens unit (not shown) and an aperture stop (shown in FIG. 7 with reference numeral 104).

The camera 100 includes a focal-plane shutter having plural shutter blades, and an image-pickup element 15 that is constituted by a photoelectrical conversion element such as a CCD sensor or a CMOS sensor and whose exposure amount is controlled by the focal-plane shutter 20. In an optical path L1 from the image-pickup optical system 103 to the image-pickup element 15 (that is, on an optical axis of the image-pickup optical system 103), an optical filter 11 is disposed which is formed by laminating optical elements such as an infrared cutting filter and a phase plate.

The image-pickup element 15 photoelectrically converts an object image formed by the image-pickup optical system 103 to output an image-pickup signal. Predetermined processing is performed on the image-pickup signal, and thereby an image data signal (image data) is generated. The image data is displayed on a display unit 107 provided on a back of the camera 100. A user can determine an image-pickup composition by observing the image data displayed as an electronic viewfinder image on the display unit 107. Moreover, the image data is recorded in a recording medium (not shown) such as a semiconductor memory as still image data or moving image data in response to an image-pickup starting operation of a release switch 120.

Reference numeral 111 denotes a main mirror constituted by a half mirror, which reflects a part of a light flux from the image-pickup optical system 103 and transmits another part thereof. Reference numeral 105 denotes a focusing screen on which an object image is formed by the light flux reflected by the main mirror 111. Reference numeral 112 denotes a pentaprism. Reference numerals 109-1, 109-2 and 109-3 denote viewfinder lenses to make it possible for a user to observe the object image formed on the focusing screen 105 through the pentaprism 112. The focusing screen 105, the pentaprism 112 and the viewfinder lenses 109-1 to 109-3 constitute a viewfinder optical system.

Reference numeral 163 denotes an eyepiece shutter that prevents light inversely entering through the viewfinder optical system from reaching the image-pickup element 15 to generate ghost or flare in self-timer image-pickup.

A sub-mirror 122 is provided at a back (image plane side) of the main mirror 111. The sub-mirror 122 reflects the light flux transmitted through the main mirror 111 to introduce it to a focus detection unit 121. The main mirror 111 and the sub-mirror 122 are arranged in the optical path L1 as shown in the figure when an object is observed through the viewfinder optical system, and is retracted to a position out of the optical path L1 shown by dotted lines 111' and 122' in the figure when the object is observed by the electronic viewfinder image and image-pickup is performed.

In the focus detection unit 121, an image reforming lens 166 provided in the focus detection unit 121 divides the light flux entering from the sub-mirror 122 through a condenser lens 164 and a reflective mirror 165. An area sensor 167 photoelectrically converts paired object images formed by the split light from the image reforming lens 166 to generate paired image signals. Calculating a phase difference between the paired image signals enables detection of a focus state of the image-pickup optical system 103 by a phase difference detection method.

Reference numeral 114 denotes a pop-up flash unit that is movable between a retracted position at which the flash unit 114 is retracted in the camera 100 and a pop-up position (light-emitting position) at which the flash unit 114 is protruded from the camera 100.

Reference numeral 119 denotes a main switch to turn the power of the camera 100 on and off. A half-press operation (image-pickup preparing operation) of the release switch 120 starts image-pickup preparation processing including photometry and autofocus (AF), and a full-press operation (image-pickup starting operation) of the release switch 120 starts image-pickup processing for capturing the object image and recording the image data in the recording medium.

Reference numeral 123 denotes an image stabilizing switch that is operated by the user to select whether or not to cause the image stabilizing unit to operate. Reference numeral 180 denotes an optical viewfinder information display unit that displays predetermined information on the focusing screen 105.

Reference numeral 190 denotes a shake sensor that detects shaking of the camera 100 in a pitch direction or/and a yaw direction. The shake sensor 190 is constituted by an angular velocity sensor in this embodiment, but it may be constituted by other sensors such as an acceleration sensor. The shake sensor 190 detects pitch shaking 190*p* that is angular shaking in a plane parallel to a paper plane of FIG. 1 and yaw shaking 190*y* that is angular shaking in a plane vertical to the paper plane of FIG. 1. Reference numeral 190*r* is a rolling shake sensor that is constituted by an angular velocity sensor or an acceleration sensor, and detects rotational (rolling) shaking 190*c* in a plane orthogonal to a direction of the optical axis (hereinafter referred to as the "optical axis direction") of the image-pickup optical system 103.

Figure 2:
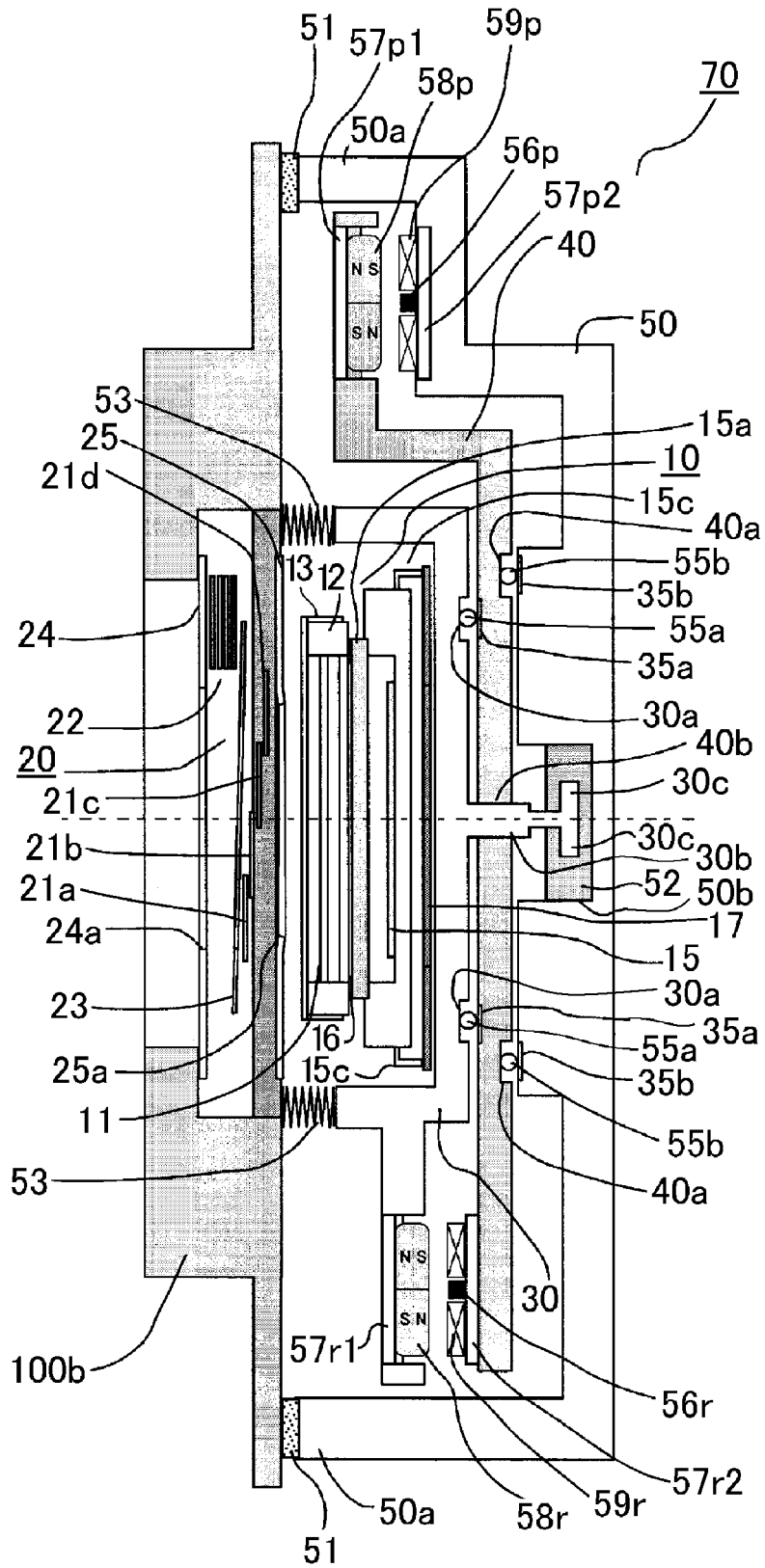
FIG. 2 is a cross-sectional view of a configuration of an image stabilizing unit provided with the camera of this embodiment.

In FIG. 2, the focal-plane shutter 20 includes a front curtain 21 constituted by plural shutter blades 21*a* to 21*d*, a rear curtain 22 constituted by plural shutter blades, and an intermediate plate 23 that separates running spaces of the front curtain 21 and the rear curtain 22. Moreover, the focal-plane shutter 20 includes a retainer plate 24 and a cover plate 25 that respectively serve as retainer plates for the rear curtain 22 and the front curtain 21. The retainer plate 24 and the cover plate 25 are respectively provided with an aperture 24*a* and an aperture 25*a* for exposure of the image-pickup element 15.

In FIGS. 2 to 5, an image-pickup part 10 includes the optical filter 11, a filter holder 12 that holds the optical filter 11, a mask member 13 having an aperture 13*a* through which effective entering light passes and blocking unnecessary entering light, the image-pickup element 15, and a cover member 15*a* that protects the image-pickup element 15. A sealing member is provided between the cover member 15*a* and the optical filter 11 for sealing a gap therebetween. Connecting terminals 15*c* of the image-pickup element 15 are connected to a substrate 17 on which a drive circuit that drives the image-pickup element 15 is formed. The image-pickup part 10 thus configured is held by a roll base 30 that is a second member.

Figure 4:
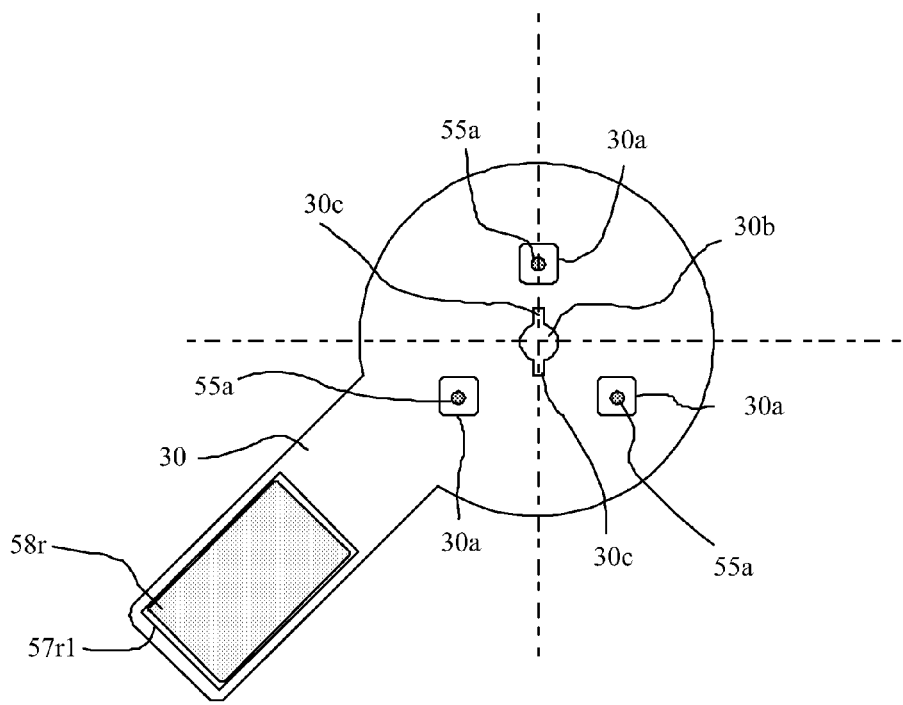
FIG. 4 is a front view showing a roll base constituting part of the image stabilizing unit.
Figure 5:
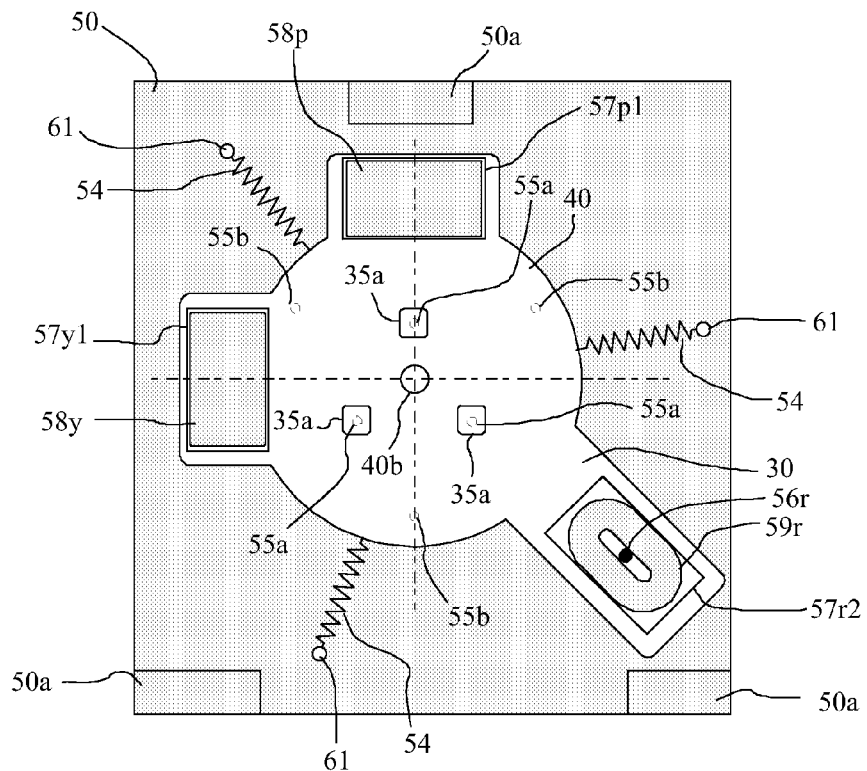
FIG. 5 is a front view showing a shift base and a base member constituting part of the image stabilizing unit.
Figure 6:
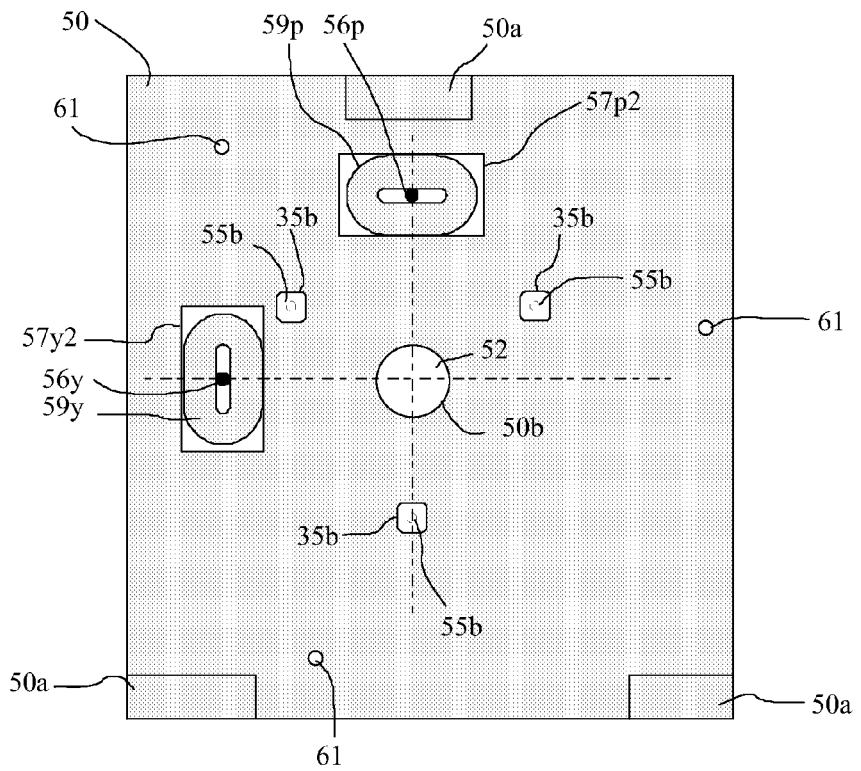
FIG. 6 is a front view of the base member.

A pin (boss) portion 30*b* that is a protruding portion extending in the optical axis direction is formed in a central part of a back face of the roll base 30. The pin portion 30*b* is rotatably inserted into a hole portion 40*b* formed in a shift base 40 that is a first member. Concave portions 30*a* are formed at circumferential three places of the back face of the roll base 30 as shown in FIG. 4, and balls 55*a* are respectively disposed in the concave portions 30*a*. Each ball 55*a* is sandwiched in the optical axis direction between the concave portion 30*a* (roll base 30) and a ball receiving face 35*a* provided in the shift base 40 and formed of metal such as copper foil.

Concave portions 40*a* are formed at circumferential three places in a marginal part of a back face of the shift base 40, and balls 55*b* are respectively disposed in the concave portions 40*a*. Each ball 55*b* is sandwiched in the optical axis direction between the concave portion 40*a* (shift base 40) and a ball receiving face 35*b* provided in a base plate 50 that is a base member of the entire image stabilizing unit 70, the ball receiving face 35*b* being formed of metal such as copper foil.

Plural compression coil springs 53 are disposed in a charged state between a chassis 100*b* of the camera 100 and the roll base 30 to bias the roll base 30 and the shift base 40 toward the base plate 50. Biasing forces of the compression coil springs 53 press the roll base 30 against the shift base 40 via the balls 55*a*, and thereby the shift base 40 is pressed against the base plate 50 via the balls 55*b*.

With this configuration, the image-pickup part 10 (image-pickup element 15) is held rotatably (rollably) in the plane orthogonal to the optical axis direction together with the roll base 30 (that is, integrally with the roll base 30) with respect to the shift base 40. Further, the image-pickup part 10 and the roll base 30 are held movable (shiftable) in the pitch direction and the yaw direction that are orthogonal to the optical axis direction together with the shift base 40 (that is, integrally with the shift base 40) with respect to the base plate 50. Thus, the image-pickup part 10 and the roll base 30 are configured to be shiftable in the pitch and yaw directions and rollable in the plane orthogonal to the optical axis direction with respect to the base plate 50.

The term "shift" in this embodiment means that the image-pickup part 10 and the roll base 30 moves in the pitch and yaw directions orthogonal to the optical axis direction with respect to the base plate 50, and the term "roll" in this embodiment means that the image-pickup part 10 and the roll base 30 rotate in the plane orthogonal to the optical axis direction with respect to the base plate 50.

A yoke 57r1 is attached to the roll base 30. A permanent magnet 58r is attracted by the yoke 57r1 to be fixed thereto. Moreover, yokes 57p and 57y are attached to the shift base 40. Permanent magnets 58p and 58y are respectively attracted by the yokes 57p and 57y to be fixed thereto.

A yoke 57r2 and a coil 59r are fixed to the shift base 40 at positions facing the permanent magnet 58r attached on the roll base 30. The coil 59r, the permanent magnet 58r and the yokes 57r1 and 57r2 constitute a rolling actuator (rotating actuator) corresponding to a second actuator. Energization of the coil 59r generates a thrust force between the coil 59r and the permanent magnet 58r, and the thrust force rolls the roll base 30 in a direction shown by an arrow 132r in the plane orthogonal to the optical axis direction with respect to the shift base 40.

A roll position detector (rotation detector) 56r constituted by a hall element is fixed to the shift base 40. The roll position detector 56r outputs an electrical signal corresponding to a change of a magnetic field caused by the roll of the permanent magnet 58r facing the roll position detector 56r together with the roll base 30. Using the electrical signal output from the roll position detector 56r enables detection of a roll amount (rotation amount) of the roll base 30.

Figure 3:
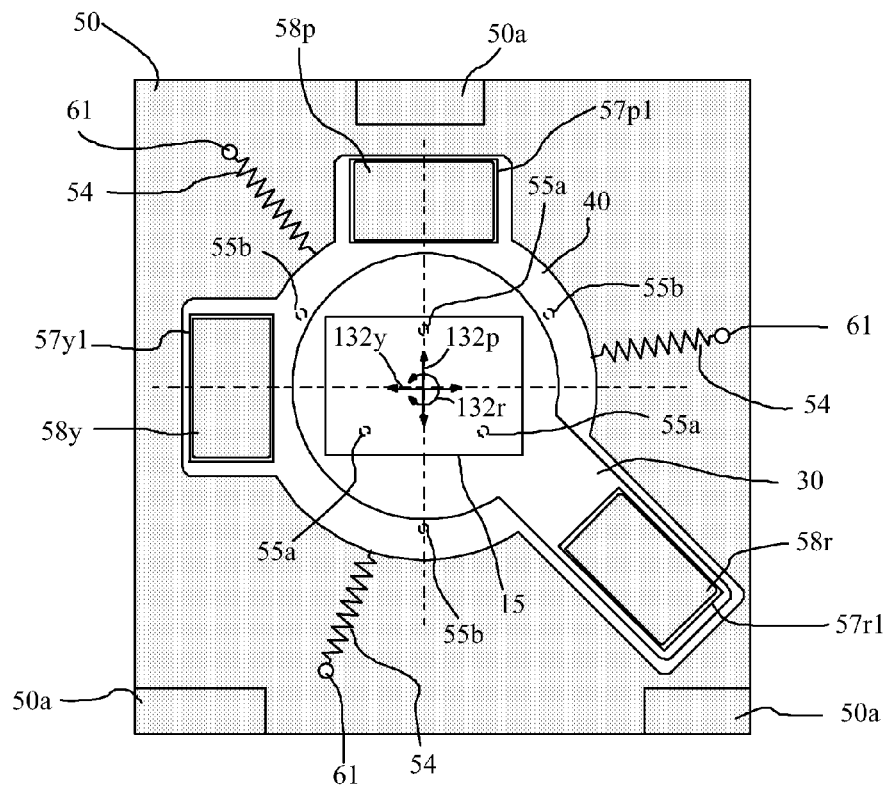
FIG. 3 is a front view showing the image stabilizing unit.

Moreover, as shown in FIG. 3, the base plate 50 is provided with three pins 61 to which one ends of three tension springs 54 are hooked, and other ends of the three tension springs 54 are hooked to circumferential three places of the shift base 40. Spring forces of the tension springs 54 hold the shift base 40 such that its center coincides with a position of the optical axis in a neutral state where the shift base 40 is not shifted by pitch and yaw shift actuators which will be described later.

Between an outer circumferential part 50a of the base plate 50 and the chassis 100b of the camera 100, adjusting members 51 such as washers are disposed so as to enable position adjustment of the image-pickup element 15 in the optical axis direction and tilt adjustment thereof with respect to the optical axis.

A concave portion 50b is formed at a central part (that is, a part intersecting with the optical axis) of the base plate 50. The pin portion 30b formed on the roll base 30 is inserted into the concave portion 50b. In the concave portion 50b, a damper material 52 such as silicone gel is disposed. The damper material 52 has a function of attenuating shift and roll of the axis part 30b (that is, of the roll base 30) with respect to the concave portion 50b (that is, with respect to the base plate 50). The axis part 30b includes projecting portions 30c at its tip, the projecting portions 30c projecting in a radial direction of the axis part 30b as shown in FIG. 4. The projecting portions 30c have a larger contact area contacting the damper material 52 than that of the axis part 30b, which increases the attenuating effect of the damper material 52 attenuating the shift and roll of the roll base 30. Thus, the concave portion 50b, the axis part 30b including the projecting portions 30c and the damper material 52 can constitute a compact damper mechanism having a highly attenuating effect to attenuate the shift and roll of the roll base 30.

Yokes 57p and 57y and coils 59p and 59y are fixed to the base plate 50 at positions facing the permanent magnets 58p and 58y attached on the shift base 40. The coil 59p, the permanent magnet 58p and the yokes 57p1 and 57p2 constitute a pitch shift actuator. The coil 59y, the permanent magnet 58y and the yokes 57y1 and 57y2 constitute a yaw shift actuator. Each of the pitch and yaw shift actuators corresponds to a first actuator.

Energization of the coil 59p generates a thrust force between the coil 59p and the permanent magnet 58p, and the thrust force shifts the shift base (together with the roll base 30 and the image-pickup part 10) in the pitch direction shown by an arrow 132p in FIG. 3. Energization of the coil 59y generates a thrust force between the coil 59y and the permanent magnet 58y, and the thrust force shifts the shift base (and the roll base 30 and the image-pickup part 10) in the yaw direction shown by an arrow 132y in FIG. 3.

A pitch shift position detector 56p and a yaw shift position detector 56y each of which is constituted by a hall element are fixed to the base plate 50. These shift position detectors 56p and 56y output electrical signals corresponding to changes of magnetic fields caused by the shift of the permanent magnets 58p and 58y facing the shift position detectors 56p and 56y together with the shift base 40. Using the electrical signals output from the shift position detectors 56p and 56y enables detection of shift amounts of the shift base 40 in the pitch and yaw directions.

Description will be made of an electrical configuration of the camera system of this embodiment with reference to FIG. 7. The camera system includes an image-pickup system, an image processing system, a recording/replaying system and a controlling system.

The image-pickup system is constituted by the image-pickup optical system 103 and the image-pickup element 15. The image processing system includes an A/D converter 130 that performs A/D conversion of the image-pickup signal output from the image-pickup element 15, an RGB image processing circuit 131 that performs various image processing on a digital image-pickup signal from the A/D converter 130 to generate a color image signal (image data), and a YC processing circuit 132.

The recording/replaying system is constituted by a record processing circuit 133 that records the image data to a recording medium, and a replay processing circuit 134 that replays the image data recorded in the recording medium to display it on the display unit 107. The controlling system is constituted by a camera system controlling circuit 135 as a controller that governs control of the entire camera 100, an operation detection circuit 136 that detects various user's operations, and an image-pickup element driving circuit 137 that drives the image-pickup element 15.

Reference numeral 138 denotes a connection terminal to which an external apparatus such as a personal computer is connected. The camera 100 sends the image data to the external apparatus through the record processing circuit 133 and the connection terminal 138.

The camera system controlling circuit 135 controls a stop actuator 143 through a lens system controlling circuit 141 provided in the lens apparatus 102 to drive the aperture stop 104 included in the image-pickup optical system 103. The camera system controlling circuit 135 also controls drive of the focal-plane shutter 20 through a shutter controlling circuit 145 to control an exposure amount of the image-pickup element 15. The camera system controlling circuit 135 further controls a charge accumulating operation of the image-pickup element 15 and an image-pickup signal reading operation therefrom through the image-pickup element driving circuit 137.

Reference numeral 140 denotes an AF controlling circuit that receives the paired image signals from the focus detection unit 121 (area sensor 167) to calculate the phase difference of the paired image signals. The AF controlling circuit 140 calculates a defocus amount of the image-pickup optical system 103 from the phase difference, and then calculates on the basis of the defocus amount a movement amount of the focus lens (not shown) included in the image-pickup optical system 103 for obtaining an in-focus state. The AF controlling circuit 140 sends information on the movement amount of the focus lens to the lens system controlling circuit 141 through the camera system controlling circuit 135. The lens system controlling circuit 141 drives an AF motor 147 on the basis of the information on the movement amount to move the focus lens, thereby obtaining the in-focus state.

Further, the camera system controlling circuit 135 controls drive of the optical viewfinder information display unit 180 through an information display circuit 142 to cause the optical viewfinder information display unit 180 to display various information in the viewfinder optical system.

Reference numeral 126 denotes a lens attachment sensor provided in the mount portion 101 of the camera 100. The camera system controlling circuit 135 detects that the lens apparatus 102 is attached to the mount portion 101 through the lens attachment sensor 126.

Reference numerals 101a and 102a denote mount contacts that are electrical contacts respectively provided in the mount portion 101 of the camera 100 and a mount portion of the lens apparatus 102. The camera system controlling circuit 135 communicates with the lens system controlling circuit 141 through the mutually connected mount contacts 101a and 102a.

The camera system controlling circuit 135 is connected to the shake sensors 190 and 190r, the shift position detectors 56p and 56y and the roll position detector 56r. The camera system controlling circuit 135 performs integration calculation on each of output signals (angular velocity signals) from the shake sensors 190 and 190r, and then converts the integrated signals into shake signals showing angular displacements in the pitch, yaw and roll directions. Then, the camera system controlling circuit 135 calculates target shift positions of the shift base 40 in the pitch and yaw directions and a target roll position of the roll base 30 (image-pickup element 15) such that displacements of the object image on the image-pickup element 15 due to the angular displacements in the pitch, yaw and roll directions are canceled.

Further, the camera system controlling circuit 135 energizes the coils 59p and 59y according to the calculated target shift positions to shift the shift base 40 in the pitch and yaw directions, and energizes the coil 59r according to the calculated target roll position to roll the roll base 30.

The camera system controlling circuit 135 compares the shift positions of the shift base 40 in the pitch and yaw directions detected by the shift position detectors 56p and 56y with the target shift positions to control the energization of the coils 59p and 59y such that the detected shift positions coincide with the target shift positions. Further, the camera system controlling circuit 135 compares the roll position of the roll base 30 detected by the roll position detector 56r with the target roll position to control the energization of the coil 59r such that the detected roll position coincides with the target roll position. Such feedback control can shift and roll the image-pickup element 15 held by the shift base 40 and the roll base 30 accurately to the target shift positions in the pitch and yaw directions and the target roll position, thereby performing a highly accurate image blur correction (reduction) operation.

Moreover, when the shift base 40 and the roll base 30 are respectively driven to the target shift positions and the target roll position, vibrations generated due to the drive of the shift base 40 and the roll base 30 are suppressed (attenuated) by the damper material 52. Therefore, the shift base 40 and the roll base 30 hardly vibrate at the respective target positions, which achieves further improvement of the accuracy of the image blur correction.

As described above, the image stabilizing unit 70 of this embodiment performs the feedback control of the shift amount of the shift base 40 and the feedback control of the roll amount of the roll base 30 independently of each other. Therefore, the image blur correction operation in the roll direction does not influence the shift amount of the shift base 40 and the image blur correction operation in the shift direction does not influence the roll amount of the roll base 30, which enables improvement of the image blur correction accuracy in each of the shift direction and the roll direction.

Moreover, the shift base 40 and the roll base are arranged on the base plate 50, which makes it possible to dispose the damper material 52 at the central part intersecting with the optical axis in the base plate 50. This enables simultaneous vibration suppression of the roll base 30 and the shift base 40, and enables further improvement of the image blur correction accuracy at the target shift and roll positions, as compared with a case where the damper material 52 is disposed at a position other than the central part in the base plate 50.

If the roll base 30 and the shift base 40 are driven to the target roll and shift positions while their vibrations are suppressed by the damper material 52, the roll base 30 and the shift base 40 minutely vibrate until becoming completely still. This minute vibration is attenuated by the damper material 52. However, if the damper material 52 is disposed at the position other than the central part of the base plate 50, before the minute vibration is attenuated, the minute vibration and elasticity of the tension springs 54 cause the roll base 30 or the shift base 40 to roll or shift around the position other than the central part of the base plate 50, which deteriorates the image.

In contrast thereto, when the damper material 52 is disposed at the central part of the base plate 50 as described in this embodiment, even if the minute vibration causes the roll base 30 and the shift base 40 to roll or shift until they becomes still, the roll base 30 and the shift base 40 are rolled or shifted around the central part, and therefore the deterioration of the image is hardly caused. Accordingly, the image blur correction accuracy can be improved as mentioned above.

Although the above embodiment has described the image stabilizing unit equipped in the single-lens reflex digital camera as one of image-pickup apparatuses, alternative embodiments of the present invention include image stabilizing apparatuses equipped to other image-pickup apparatuses such as lens-integrated digital cameras, video cameras, monitoring cameras, web cameras and cameras for cellular phones.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2009-199250, filed on Aug. 31, 2009, which is hereby incorporated by reference herein in its entirety.

What is claimed is:

1. An image stabilizing apparatus comprising:
a base member;
a first member configured to be shiftable with respect to the base member in a direction orthogonal to an optical axis direction;
a first actuator configured to shift the first member with respect to the base member;
an image-pickup element constituted by a photoelectrical conversion element;
a second member configured to hold the image-pickup element, and configured to be shiftable together with the first member in the direction orthogonal to the optical axis direction and rotatable with respect to the first member in a plane orthogonal to the optical axis direction, wherein the second member is provided with a protruding portion extending in the optical axis direction;

a damper mechanism configured to attenuate shift of the protruding portion in the direction orthogonal to the optical axis direction and rotation thereof in the plane orthogonal to the optical axis direction;

a second actuator configured to rotate the second member with respect to the first member.

2. An image stabilizing apparatus according to claim 1, further comprising:

a shift detector configured to detect a shift position of the first member;

a rotation detector configured to detect a rotation position of the second member; and a controller configured to control the first actuator using an output from the shift detector and control the second actuator using an output from the rotation detector.

3. An image pickup apparatus comprising:

an image stabilizing apparatus according to claim 1; and an image generating part configured to generate image data using an output signal from the image-pickup element.

* * * * *